US009131145B2

(12) United States Patent
Hamano

(10) Patent No.: US 9,131,145 B2
(45) Date of Patent: Sep. 8, 2015

(54) IMAGE PICKUP APPARATUS AND CONTROL METHOD THEREFOR

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 13/959,903

(22) Filed: Aug. 6, 2013

(65) Prior Publication Data

US 2014/0043522 A1 Feb. 13, 2014

(30) Foreign Application Priority Data

Aug. 10, 2012 (JP) ................................ 2012-178059

(51) Int. Cl.
*H04N 5/232* (2006.01)

(52) U.S. Cl.
CPC ....... *H04N 5/23212* (2013.01); *H04N 5/23219* (2013.01)

(58) Field of Classification Search
CPC ....................... H04N 5/23212; H04N 5/23219
See application file for complete search history.

(56) References Cited

U.S. PATENT DOCUMENTS 7,945,152 B2 * 5/2011 Hirai et al. .................... 396/123
2007/0013791 A1 * 1/2007 Kinoshita et al. ............ 348/239
2008/0284901 A1 * 11/2008 Misawa ........................ 348/349
2009/0196461 A1 * 8/2009 Iwamoto ....................... 382/103
2010/0020191 A1 * 1/2010 Sugimoto .................. 348/222.1
2010/0040356 A1 * 2/2010 Ishikawa ...................... 396/124

FOREIGN PATENT DOCUMENTS

JP 2006293782 A * 10/2006
JP 2007057763 A 3/2007
JP 2009098317 A 5/2009
JP 2010078810 A 4/2010
JP 201139460 A 2/2011
JP 2011113174 A 6/2011

* cited by examiner

*Primary Examiner* — Timothy J Henn

(74) *Attorney, Agent, or Firm* — Canon USA Inc. IP Division

(57) ABSTRACT

An image pickup apparatus includes an image sensor configured to capture an image, a focus detection area setting unit configured to set a focus detection area with respect to a face detection area of the object within an imaging plane of the image sensor, and a focus detection unit configured to obtain a focus evaluation value indicating contrast in a focus evaluation direction of the object in the focus detection area set within the imaging plane of the image sensor based on an image signal obtained by photoelectric conversion by the image sensor, and the focus detection area setting unit sets the focus detection area such that a length of the focus detection area in the focus evaluation direction is shorter than a length of the focus detection area in a second direction perpendicular to the focus evaluation direction regardless of a tilt of a face of the object.

7 Claims, 7 Drawing Sheets

FIG. 5

| FACE SIZE | TILT | EXPANSION/ CONTRACTION RATE (X) | EXPANSION/ CONTRACTION RATE (Y) | CENTER-OF-GRAVITY POSITION (Y) |
|---|---|---|---|---|
| FACE SIZE ≧ A | 0 DEGREES ± 22.5 DEGREES | x1 | y1 | p1 |
| | 45 DEGREES ± 22.5 DEGREES | x2 | y2 | p2 |
| | 90 DEGREES ± 22.5 DEGREES | x3 | y3 | p3 |
| FACE SIZE < A | 0 DEGREES ± 22.5 DEGREES | x4 | y4 | p4 |
| | 45 DEGREES ± 22.5 DEGREES | x5 | y5 | p5 |
| | 90 DEGREES ± 22.5 DEGREES | x6 | y6 | p6 |

IMAGE PICKUP APPARATUS AND CONTROL METHOD THEREFOR

BACKGROUND OF THE INVENTION

1. Field of the Invention

The present invention relates to an image pickup apparatus performing focus detection by using an image signal obtained by an image sensor, which photoelectrically converts an object image formed by an imaging optical system, and a control method for the image pickup apparatus.

2. Description of the Related Art

Many digital cameras and video cameras employ an autofocusing method called the contrast detection autofocus (AF) method. This method uses a signal output from an image sensor such as a charge-coupled device (CCD) or a complementary metal oxide semiconductor (CMOS) and detects a signal corresponding to a contrast evaluation value of the object. According to this method, contrast evaluation values of the object are sequentially detected (i.e., AF scanning operation) while the focus lens moves in a predetermined range in the optical axis direction. The focus lens position having the largest contrast evaluation value is determined as the in-focus position.

Further, there is known an image pickup apparatus which, by using a signal output from an image sensor, executes face detection processing by detecting a face of a person in an imaging range and performs focus control so that the face is in focus.

Japanese Patent Application Laid-Open No. 2009-98317 discusses a method that performs face detection and determines an AF target area (focus detection area) from a face detection area detected by the contrast detection AF method. According to this method, since the size of the AF target area is changed according to the size of the detected face, the effect of the background is reduced and high-precision focus detection can be realized.

Further, Japanese Patent Application Laid-Open No. 2011-39460 discusses a method that performs face detection, sets a main AF target area in the face area, and further sets an auxiliary AF area in the periphery of the main AF target area. Since the main AF target area is set in the face area, it is less likely to be affected by the background.

However, according to the conventional technique discussed in the above-described Japanese Patent Application Laid-Open No. 2009-98317, since the AF target area includes the face outline, the face outline goes in and out of the AF target area when the scanning operation is performed. This affects the contrast evaluation value and reduces the focus detection accuracy. Especially, in a backlight condition where the background is brighter than the face, the focus detection is significantly affected.

On the other hand, according to the conventional technique discussed in Japanese Patent Application Laid-Open No. 2011-39460, since the AF target area is set in the detected face detection area, the in-and-out of the face outline with respect to the AF target area during the AF scanning operation is reduced. However, if the face makes a comparatively large movement, the AF target area is affected by the movement. The effect of the movement of the face during the AF scanning operation can be reduced by reducing the size of the AF target area. However, if the AF target area becomes smaller, the information amount of contrast evaluation values obtained from the AF target area is reduced, and the focus accuracy may be reduced in low luminance or low contrast environment.

Further, the direction of the face outline, which is more likely to affect the contrast evaluation value, is not referred to in the above-described Japanese Patent Application Laid-Open No. 2009-98317 and Japanese Patent Application Laid-Open No. 2011-39460.

SUMMARY OF THE INVENTION

The present invention is directed to an image pickup apparatus including a focus detection device capable of realizing high-precision focus detection even if an object moves during an AF scanning operation, and a control method therefor.

According to an aspect of the present invention, an image pickup apparatus includes an image sensor configured to capture an image of an object formed by an imaging optical system, a focus detection area setting unit configured to set a focus detection area with respect to a face detection area of the object within an imaging plane of the image sensor, and a focus detection unit configured to obtain a focus evaluation value indicating contrast in a focus evaluation direction of the object in the focus detection area set within the imaging plane of the image sensor based on an image signal obtained by photoelectric conversion by the image sensor. The focus detection area setting unit sets the focus detection area such that a length of the focus detection area in the focus evaluation direction is shorter than a length of the focus detection area in a second direction perpendicular to the focus evaluation direction regardless of a tilt of a face of the object.

According to an exemplary embodiment of the present invention, there can be provided an image pickup apparatus including a focus detection device capable of realizing high-precision focus detection even if a tilt of a face of an object is changed during an AF scanning operation, and a control method for the image pickup apparatus.

Further features of the present invention will become apparent from the following description of exemplary embodiments with reference to the attached drawings.

BRIEF DESCRIPTION OF THE DRAWINGS

FIG. 5 illustrates an example of a data table used for setting the focus detection area according to the first exemplary embodiment.

DESCRIPTION OF THE EMBODIMENTS

Figure 1:
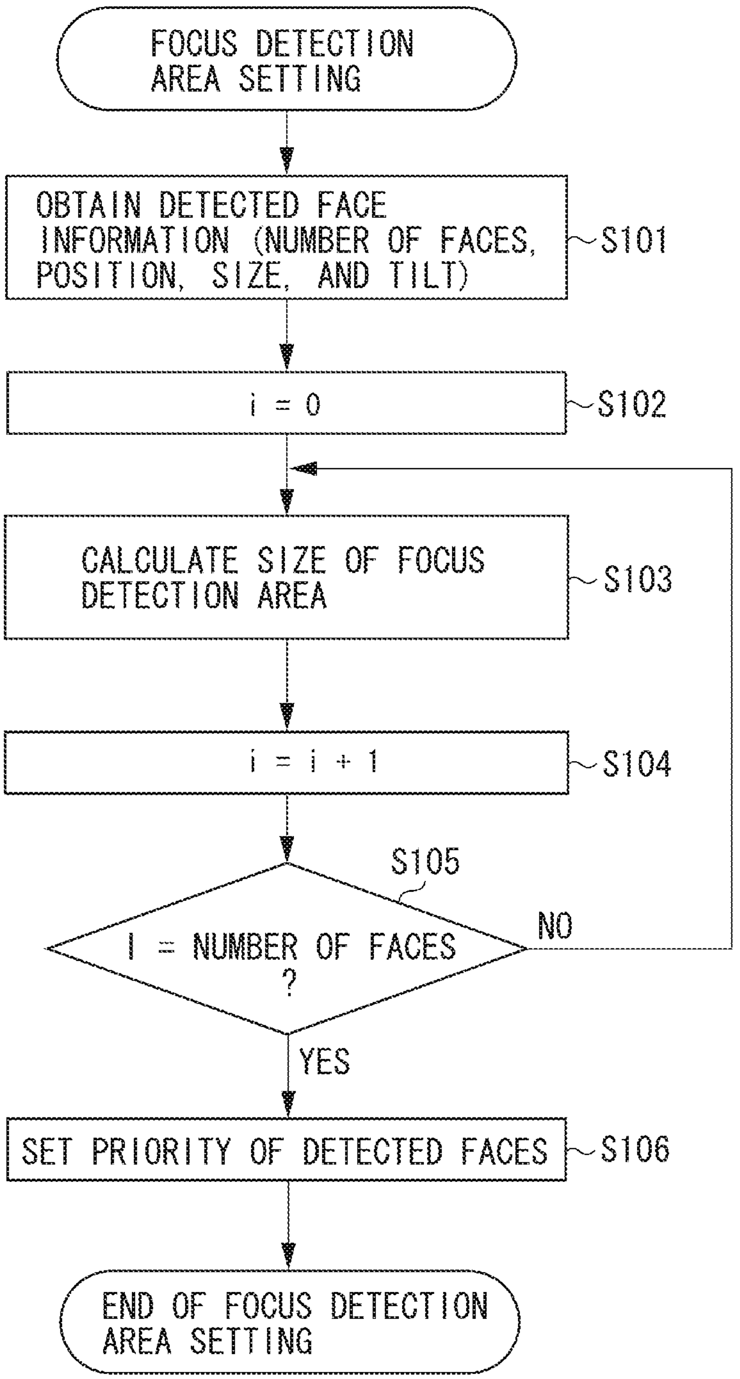
FIG. 1 is a flowchart illustrating focus detection area setting processing according to a first exemplary embodiment of the present invention.
Figure 2:
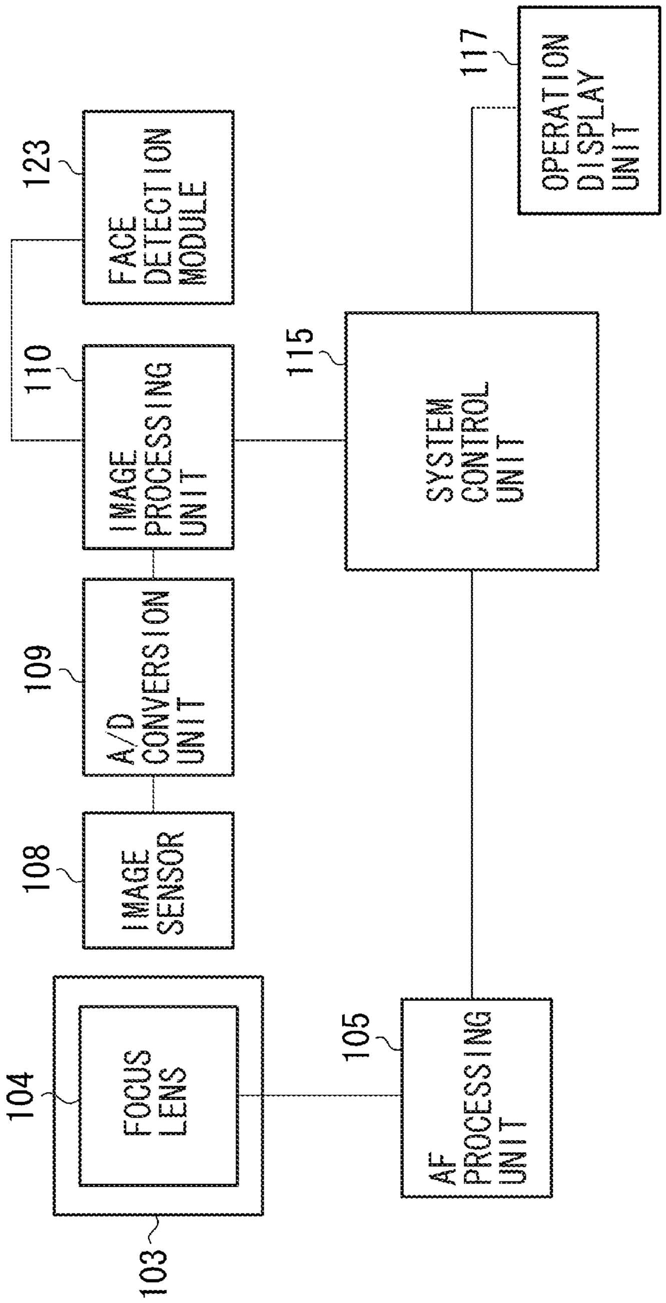
FIG. 2 is a block diagram illustrating a configuration of an electronic camera according to the first exemplary embodiment.

A first exemplary embodiment of the present invention will be described in detail with reference to FIGS. 1 to 6. FIG. 2 is a block diagram illustrating an example of a schematic configuration of an image pickup apparatus including a focus detection device according to the present invention. The image pickup apparatus is, for example, a digital still camera or a digital video camera. However, the image pickup apparatus is not limited to such a camera and the present invention can be applied to a different apparatus so long as the apparatus can obtain an incident optical image as an electric image by photoelectric conversion performed by a two-dimensional image sensor such as an area sensor.

In FIG. 2, photographic lenses 103 are lenses as an imaging optical system which forms an image of an object on an image sensor 108 described below. A focus lens 104 is included in the photographic lenses 103 so that an image formed on the image sensor 108 is in focus. An AF processing unit 105 serves as a focus detection unit.

The image sensor 108 photoelectrically converts light reflected from an object into an electric signal. An A/D conversion unit 109 includes a correlated double sampling (CDS) circuit which removes output noise of the image sensor 108 and a nonlinear amplification circuit which performs nonlinear amplification before the A/D conversion. An image processing unit 110 processes images. An operation display unit 117 displays operating instructions and the state of the camera as well as images. When the imaging is performed, the operation display unit 117 displays an imaging screen and a focus detection area.

A face detection module 123 detects one or a plurality of faces from the field by using an image signal processed by the image processing unit 110, and sends information of the detected faces (position, size, reliability, face orientation, and number of the detected faces) to a system control unit (hereinafter referred to as a central processing unit (CPU)) 115. The face detection module 123 is an object information acquisition unit. Since the face detection method is not the principal objective of the present invention, detailed description of the method is omitted.

Next, an AF operation of the electronic camera according to the present embodiment when a face is detected will be described with reference to the flowchart in FIG. 3 and the illustration in FIG. 4. In step S1, based on the face information (position, size, and number of detected faces) obtained from the face detection module 123, the main object is determined and the focus detection area is set. The AF processing unit 105 performs the setting of the focus detection area. The AF processing unit 105 is a focus detection area setting unit.

Next, characteristic points of the setting method of the focus detection area according to the present embodiment will be described with reference to FIG. 4. As illustrated in FIG. 4, a focus detection area is set in a face detection area on the screen detected by the face detection module 123. Face detection areas 301*a*, 302*a*, 303*a*, and 304*a* in dotted borders are face areas of persons 301, 302, 303, and 304 in an imaging screen 500. Further, focus detection areas 301*b*, 302*b*, 303*b*, and 304*b* in solid borders are set for the face detection areas 301*a*, 302*a*, 303*a*, and 304*a*.

The face detection areas 301*a* to 304*a* are set according to the size of the face detection areas of the persons 301 to 304. Since the face detection area of the person 304 is small, the face detection area 304*a* is smaller than the face detection areas 301*a* to 303*a*. Further, the face orientations of the persons 301 to 303 are different in the imaging screen 500. According to the present embodiment, as in the persons 301 to 304 illustrated in FIG. 4, the lengths in the horizontal and vertical directions of the focus detection area are changed with respect to the face detection area according to the orientation and size of the face. The setting method of the focus detection will be described in detail below.

Processing in step S1 will be described below with reference to FIG. 1. In step S2, the CPU 115 performs the AF scanning (focus detection operation) for each focus detection area set in step S1, and the processing proceeds to step S3. When the AF scanning is performed, the focus lens 104 moves by a predetermined amount from a scanning start position to a scanning end position. The AF evaluation value at each focus lens position is stored in the CPU 115 during the movement of the focus lens.

For example, the scanning start position is set to the infinite distance and the scanning end position is set to the closest distance in a range where the AF scanning is possible. In step S3, the CPU 115 calculates a peak position (maximum position) of the AF evaluation value obtained in step S2, and the processing proceeds to step S4. In step S4, the CPU 115 performs the in-focus determination (in-focus state determination) of the peak position of each focus detection area, and the processing proceeds to step S5.

More precisely, in step S4, the presence/absence of the maximum value of the AF evaluation values with respect to the focus lens position is determined. If the maximum value exists, the focus lens position is calculated. Further, the reliability of the change curve of the AF evaluation values in the vicinity of the maximum value is evaluated. According to this reliability evaluation, whether the maximum AF evaluation value is obtained by the image forming of the optical image of the object on the image sensor 108 or by disturbance factors is determined.

As a detailed method for the in-focus determination, for example, the method discussed in Japanese Patent Application Laid-Open No. 2010-078810 (FIGS. 10 to 13) can be used.

Specifically, the focus determination is made by determining whether the AF evaluation values show the bell curve that indicates the in-focus state from the difference between the maximum and minimum AF evaluation values, the length of a tilt portion by a predetermined value (SlopeThr) or more, and the slope of the tilt portion.

In step S5, the CPU 115 performs the focus detection area selection operation and selects the focus detection area used for determining the in-focus position. The processing in step S5 will be described below with reference to FIG. 6. In step S6, the CPU 115 determines whether the focus detection area is selected in step S5. If the focus detection area is selected (YES in step S6), the processing proceeds to step S7. If the focus detection area is not selected (NO in step S6), the processing proceeds to step S9.

In step S7, the CPU 115 drives the focus lens 104 to the peak position of the AF evaluation value in the selected focus detection area as the in-focus position, and then the processing proceeds to step S8. In step S8, the CPU 115 displays an in-focus frame on an image displaying unit of the operation display unit 117, and then the AF operation ends. The in-focus frame indicates the area which is in-focus in the image area. For example, if a face is in-focus, the face area is surrounded by the in-focus frame. Further, a certain color (e.g., green) that indicates the in-focus state is used for the in-focus frame so that the user can easily determine the in-focus state.

In step S9, the AF processing unit 105 moves the focus lens 104 to a focus lens position (hereinafter referred to as a face estimated position) which corresponds to the distance of the person estimated from the face size detected by the face detection module 123, and the processing proceeds to step S10. In step S10, the CPU 115 displays an out-of-focus frame on the image displaying unit of the operation display unit 117, and the AF operation ends. The out-of-focus frame indicates the area in the image area where the object exists or a predetermined area which is out of focus. A color (e.g., yellow)

different from the color for the in-focus frame is used for the out-of-focus frame so that the user can easily determine the out-of-focus state.

Next, the operation of the focus detection area setting performed in step S1 in FIG. 3 will be described with reference to the flowchart in FIG. 1. According to the processing in the flowchart, a focus detection area is set for each face with respect to the face detection area referred to in FIG. 3.

In step S101, face information (number of faces, position, size, and tilt) detected by the face detection module 123 is obtained, and the processing proceeds to step S102. In step S102, a variable "i", which is used for counting the number of faces, is set to 0, and the processing proceeds to step S103.

In step S103, the AF processing unit 105 calculates the size of the focus detection area (solid line) with respect to the detected face detection area (dotted line). Details of the calculation method are described below with reference to FIG. 4. The imaging screen 500 in FIG. 4 corresponds to the image sensor 108. The AF processing unit 105 determines the X direction in FIG. 4 to be the AF evaluation direction to calculate contrast information as an AF evaluation value.

Generally, regarding facial parts, higher contrast is obtained from dark portions such as the hair, eyebrow, and eye, and the portions shaded with openings such as the nose and mouth. The AF evaluation values of such portions are increased. Thus, it is desirable to include high-contrast portions in the focus detection area.

Further, when the contrast between the face and the background is high, the AF evaluation value of the face outline is increased. However, if the focus detection area includes the face outline, a near-far composition due to the effect of the background may occur. The near-far composition in the focus detection area including such a face and background may occur when, for example, a distant image in the background is in focus or when an ear, being a part of the face outline, is in focus instead of the eyes which the photographer intends to focus.

Thus, there is a publicly-known technique which reduces the impact of the face outline on the AF evaluation value. According to this technique, an area that does not include the face outline is set as the focus detection area. Accordingly, even if the face moves during the AF scanning operation, the impact of the face outline on the AF evaluation value is reduced.

However, if a small focus detection area is set, the above-described high-contrast portion of the face may not be included in the focus detection area.

Thus, according to the present embodiment, the setting of a focus detection area is made such that the high-contrast portion of the face is included in the focus detection area as much as possible and the focus detection area is less likely to be affected by the face outline. To be more precise, with respect to the AF evaluation direction (X direction), the expansion/contraction ratio of the focus detection area to the face detection area in the direction of the face outline which has more impact on the AF evaluation value is set to a smaller value. On the other hand, with respect to the AF evaluation direction (X direction), the expansion/contraction ratio of the focus detection area to the face detection area in the direction of the face outline which has less impact on the AF evaluation value is set to a greater value.

Thus, the AF processing unit 105 sets a first expansion/contraction ratio, which corresponds to the length of the focus detection area to the length of the face detection area in the AF evaluation direction, smaller than a second expansion/contraction ratio, which corresponds to the length of the focus detection area to the length of the face detection area in a second direction which is perpendicular to the AF evaluation direction, regardless of the degree of tilt of the face of the object.

Further, if the detected face size is small, a sufficient AF evaluation values cannot be obtained from the face area and the ear or eye may be included in the depth of field. Thus, the focus detection area is set so that the area includes the face outline. Details of the setting method of the focus detection area will be described below.

The straight line connecting the two eyes of the person 301 is perpendicular to the AF evaluation direction. The direction of the straight line connecting the two eyes as a first direction corresponds to the Y direction. Regarding the person 301, the lateral direction of the face corresponds to the Y direction and the longitudinal direction of the face corresponds to the X direction. Since the outlines of the jaw and the head included in the face outline are perpendicular to the AF evaluation direction, the impact on the AF evaluation value is great. On the other hand, the outlines of the right and the left ears are approximately in the direction parallel to the AF evaluation direction. Therefore, even if the face outline is in the focus detection area, the contrast in the AF evaluation direction is not detected, and the impact on the AF evaluation value is small.

In the focus detection area 301*b* of the person 301, the expansion/contraction ratio in the lateral direction of the face (Y direction) in the face detection area 301*a* is set to be greater than the expansion/contraction ratio in the longitudinal direction of the face (X direction) in the face detection area 301*a*. The center-of-gravity position of the focus detection area 301*b* may be set so that the position statistically includes many high-contrast portions in the face area. Information of the expansion/contraction ratio and the center-of-gravity position of the focus detection area are stored in the CPU 115.

FIG. 5 illustrates an example of a data table stored in the CPU 115 and used for setting the focus detection area. As illustrated in FIG. 5, a threshold value is set for the face size and parameters used for setting the focus detection area are classified. As described above, the parameters are classified considering insufficient information due to a small face detection area or the impact of near-far composition inside the face detection area (ear and eye). The threshold value A of the face size is set according to the length of the diagonal line, the lengths of the four sides of the face detection area, and the area of the face detection area.

The expression of the threshold value of the face size is not limited to the above-described example. Further, the threshold value is not limited to one. If a plurality of threshold values is set, the classification of the impact of the near-far composition can be performed more finely, although the necessary storage capacity of the CPU 115 will be increased.

The parameter to be used for the setting of the focus detection area is selected from FIG. 5 by using face tilt information included in the face information obtained in step S101. In FIG. 5, the tilt is classified into three types: 0 degrees, 45 degrees, and 90 degrees. If the face tilt is 180 degrees, 225 degrees, or 270 degrees, the expansion/contraction ratio of 0 degrees, 45 degrees, and 90 degrees can be used. In this case, the positive/negative value of the correction amount of the center-of-gravity position of the focus detection area is changed from positive to negative.

Further, based on the premise that a face is bilaterally symmetric, a same value can be used for a face tilted at an angle of 45 degrees and 135 degrees. Further, the classification of the tilt is not limited to the three types illustrated in FIG. 5. If the number of classification is increased, the classification of the impact of the near-far composition can be performed more finely, although the necessary storage capacity of the CPU 115 will be increased.

Since the face size of the person 301 is greater than the threshold value A and the tilt is approximately 90 degrees, the focus detection area is set by using the expansion/contraction ratios x3 and y3 and the center-of-gravity position p3. If the lengths of the face detection area 301*a* of the person 301 in the X and Y directions are Xa(301) and Ya(301), respectively, and the center-of-gravity position is Pa(301), the lengths of Xb(301) and Yb(301), which are lengths of the focus detection area in the X and Y directions, respectively, and the center-of-gravity position Pb(301) are calculated according to equations (1), (2), and (3) as below:

$$Xb(301)=x3\times Xa(301) \quad (1)$$

$$Yb(301)=y3\times Ya(301) \quad (2)$$

$$Pb(301)=Pa(301)+p3 \quad (3)$$

By setting the focus detection area using the above-described equations, an AF evaluation value of an area which is less likely to be affected by the face outline and includes many high-contrast portions in the face can be obtained.

Figure 4:
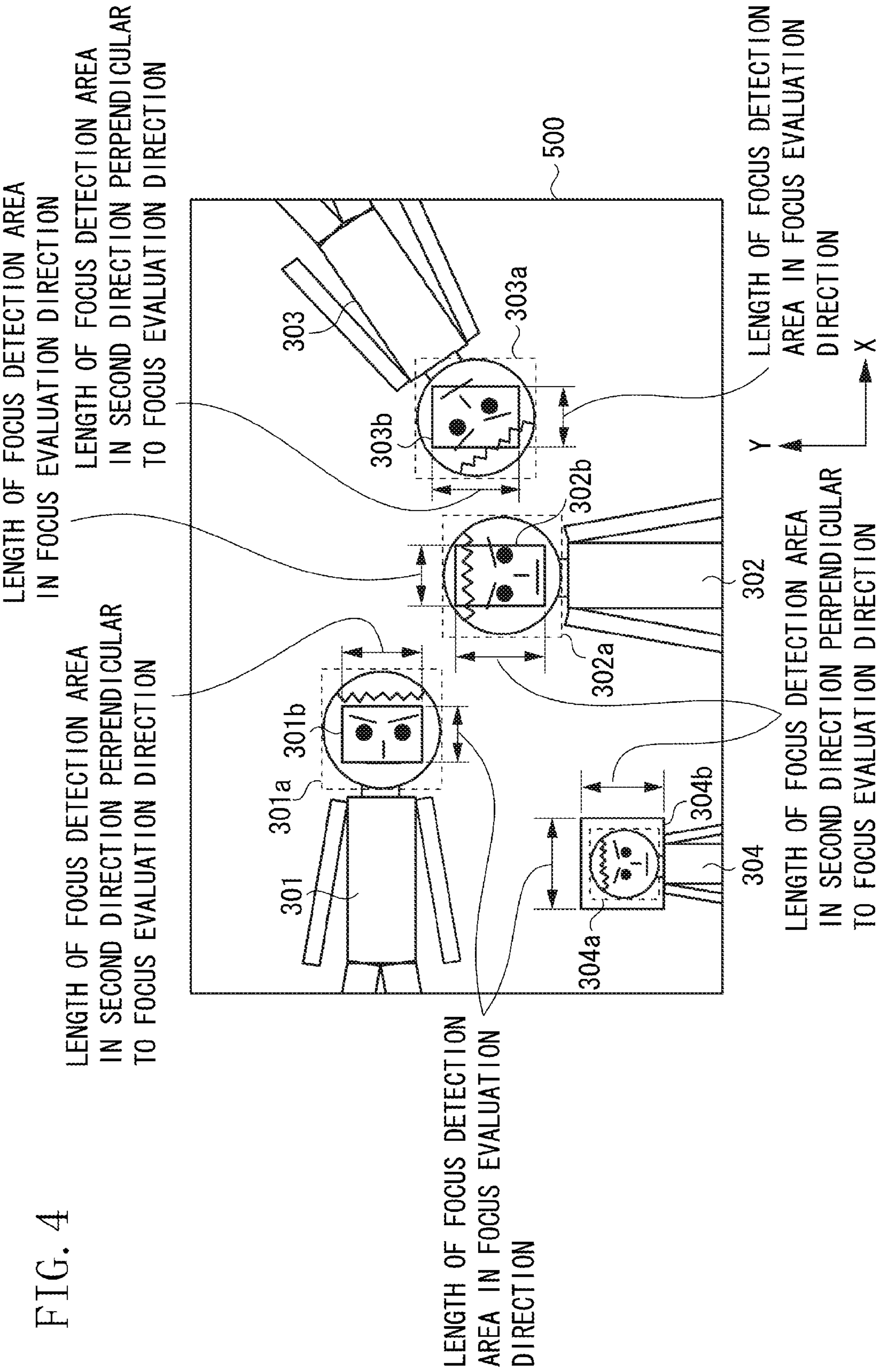
FIG. 4 illustrates the setting of a focus detection area according to the first exemplary embodiment.

In FIG. 4, the straight line connecting the two eyes of the person 302 is approximately parallel to the AF evaluation direction (X direction). Thus, the direction of the straight line connecting the two eyes corresponds to the X direction. Regarding the person 302, the lateral direction of the face corresponds to the X direction and the longitudinal direction of the face corresponds to the Y direction. Since the outlines of the left and the right ears in the face outline are perpendicular to the AF evaluation direction, the impact on the AF evaluation value is great.

On the other hand, the outlines of the jaw and the head are approximately in the direction parallel to the AF evaluation direction. Therefore, even if the face outline is in the focus detection area, the contrast in the AF evaluation direction is not detected, and the impact on the AF evaluation value is small. In the focus detection area 302*b* of the person 302, the expansion/contraction ratio in the longitudinal direction of the face (Y direction) in the face detection area 302*a* is set to be greater than the expansion/contraction ratio in the lateral direction of the face (X direction) in the face detection area 302*a*. The center-of-gravity position of the focus detection area 302*b* may be set so that the position statistically includes many high-contrast portions in the face area.

Since the face size of the person 302 is larger than the threshold value A and the tilt is approximately 0 degrees, the focus detection area is set by using the expansion/contraction ratios x1 and y1 and the center-of-gravity position p1. The equations used for the calculation of the focus detection area are the above-described equations (1) to (3).

The straight line connecting the two eyes of the person 303 is tilted by approximately 45 degrees with respect to the AF evaluation direction. In the focus detection area 303*b* of the person 303, the expansion/contraction ratio in the oblique direction of the face (Y direction) in the face detection area 303*a* is set to be greater than the expansion/contraction ratio in the oblique direction of the face (X direction) in the face detection area 303*a*. The center-of-gravity position of the focus detection area 303*b* is set so that the position statistically includes many high-contrast portions in the face area.

The face detection module 123 obtains information of the face position of the object in the imaging plane and the AF processing unit 105 changes the center-of-gravity position of the focus detection area obtained from the information of the face position of the object according to the degree of the tilt of the object.

Since the face size of the person 303 is greater than the threshold value A and the tilt is approximately 225 degrees, the focus detection area is set by using the expansion/contraction ratios x2 and y2 and the center-of-gravity position −p2. The equations used for the calculation of the focus detection area are the above-described equations (1) to (3).

As described above, if the face size is larger than the threshold value A, by changing the expansion/contraction ratio and the center-of-gravity position according to the degree of the tilt of the face, a laterally-long rectangle, a longitudinally-long rectangle, and a rectangle tilted by 45 degrees are set as the focus detection areas with respect to the faces of the persons 301, 302, and 303, respectively.

Just like the person 302, the straight line connecting the two eyes of the person 304 are parallel to the AF evaluation direction. However, the face detection area 304*a* is smaller than the face detection area 302*a*. In the focus detection area 304*b* of the person 304, the proportion of the expansion/contraction ratio in the longitudinal direction of the face (Y direction) in the face detection area 304*a* to the expansion/contraction ratio in the lateral direction of the face (X direction) in the face detection area 304*a* is set to be smaller than the proportion of the expansion/contraction ratio in the longitudinal direction of the face (Y direction) in the face detection area 302*a* to the expansion/contraction ratio in the lateral direction of the face (X direction) in the face detection area 302*a*.

The face detection module 123 obtains information of the face size of the object in the imaging plane and, if the size of the face detection area of the object is smaller than a predetermined threshold value, the AF processing unit 105 sets, compared to a case where the size of the face detection area of the object is larger than the predetermined threshold value, at least one of the first expansion/contraction ratio and the second expansion/contraction ratio to be a greater value.

Since the face size of the person 304 is smaller than the threshold value A and the tilt is approximately 0 degrees, the focus detection area is set by using the expansion/contraction ratios x4 and y4 and the center-of-gravity position p4. The equations used for the calculation of the focus detection area are the above-described equations (1) to (3).

As described above, since the size of the face detection area 304*a* (dotted line) is small, the near-far composition of the ear and the eye does not occur. Further, since it is determined that only a small amount of information is obtained from the high-contrast portion in the face, an expansion/contraction ratio for including the face outline is set. By expanding the focus detection area 304*b* (solid line) as appropriate within a range where the near-far composition due to the background image does not occur, high-precision focus detection can be performed.

Further, since the focus detection area 304*b* includes the face outline, unlike the focus detection area 302*b*, it is not necessary to set a vertically-long rectangular area for the focus detection area 304*b*. In other words, a rectangular area whose aspect ratio is close to 1, that is, a vertically-long rectangular area close to a square can be set for the focus detection area 304*b*.

Further, whether the near-far composition of the ear and the eye of the face occurs depends on whether the ear and the eye are within the depth of field. The depth of field is calculated based on the focal length of the imaging optical system, F-number of the imaging optical system, the distance of the object, and the permissible confusion circle diameter. Thus, the threshold value A of the size of the face illustrated in FIG. 5 can be changed according to the depth of field obtained from the information of the imaging optical system. This can accurately determine whether the face interior area of the object is within the depth of field and can make appropriate settings of the focus detection area.

The flowchart in FIG. 1 is now again described. A focus detection area is set for an "i"-th face based on the face information of the position, size, and tilt, and the processing proceeds to step S104. In step S104, the AF processing unit 105 increments "i" by 1, and the processing proceeds to step S105. In step S105, the AF processing unit 105 determines whether "i" is equal to the number of detected faces. If "i" is not equal to the number of detected faces (NO in step S105), the processing returns to step S103. If "i" is equal to the number of detected faces (YES in step S105), the processing proceeds to step S106.

In step S106, from the position and the size of the face detection area, the AF processing unit 105 estimates the face which the photographer considers as the main object, and sets the priority of the detected faces. More precisely, the AF processing unit 105 determines the face which is closest to the center of the image area and whose size is equal to or greater than a predetermined size as the main face. Faces other than the main face are determined as secondary faces. In other words, out of the plurality of faces which have been detected, the face selected as the main object is the main face. The focus detection area of the main face is used for determining the in-focus position. The focus detection areas of the secondary faces are not used for determining the in-focus position. However, when the in-focus state is displayed, whether a peak position and the in-focus position in a main area of a secondary face are within a predetermined range is determined, and if the peak position and the in-focus position of the secondary face are within the predetermined range, the in-focus frame is also displayed in the area of the secondary face in the image area.

Further, the secondary face is used for determining the in-focus position when the CPU 115 determines that the main face cannot be in focus according to the focus determination after the AF scanning operation. Thus, the priority of the secondary faces is determined in advance according to the distance from the center of the image area and the face size.

In the state in FIG. 4, the face in the focus detection area 302*a* is determined as the main face. The faces corresponding to other focus detection areas are determined as secondary faces. The priority of the secondary faces is in the order of the focus detection area 303*a*, 301*a*, and 304*a*. In step S106, the setting of the main face and the secondary faces is made, and then the processing ends.

Figure 6:
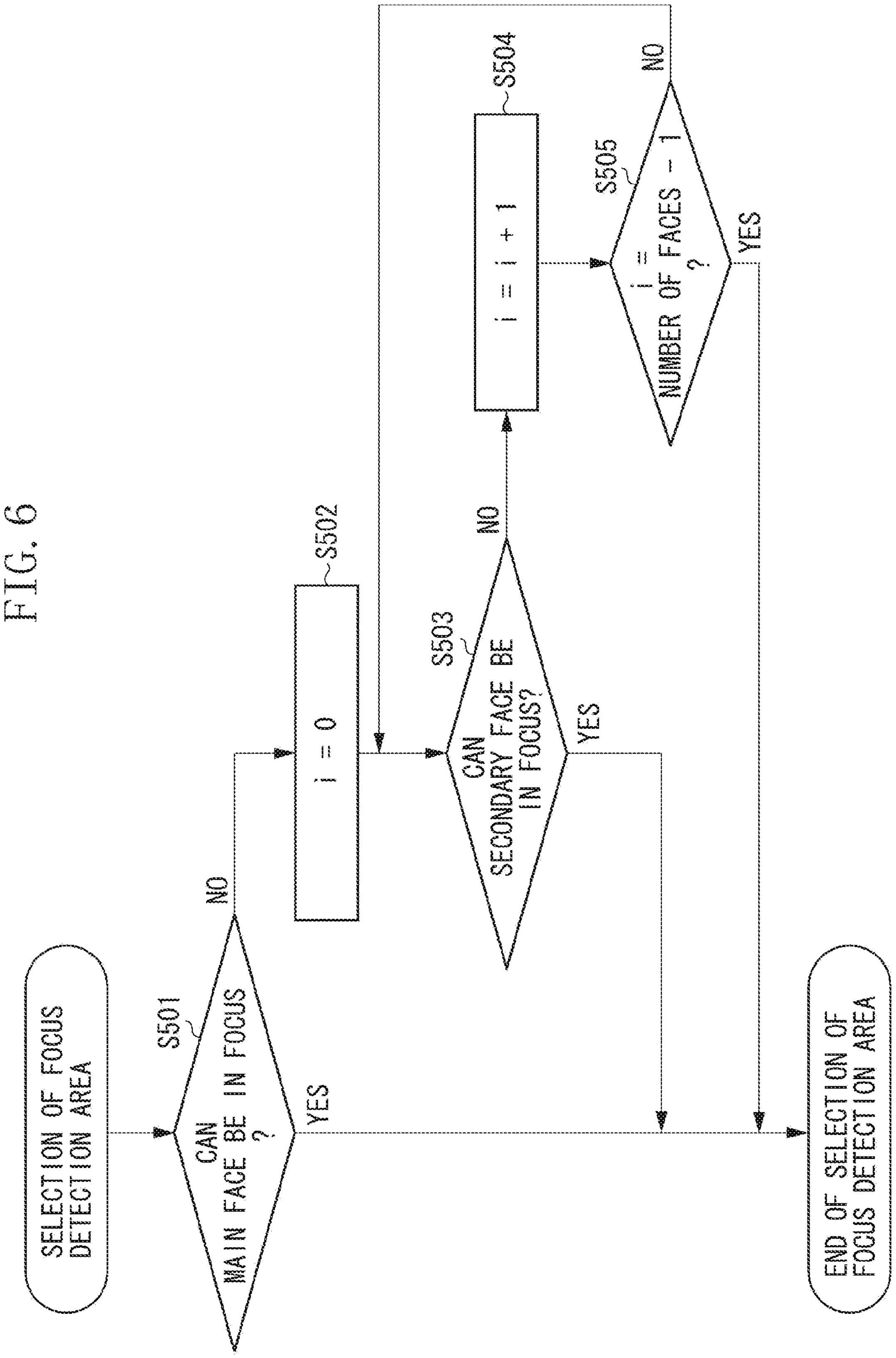
FIG. 6 is a flowchart illustrating the selection of the focus detection area illustrated in FIG. 3.

Next, the selection operation of the focus detection area in step S5 in FIG. 3 will be described with reference to the flowchart in FIG. 6. According to the flowchart in FIG. 6, whether the focus detection areas set in step S1 can be in focus is determined in the order of priority of the main face and the secondary faces based on the in-focus determination result, and the final determination of the focus detection area to be used for the focus detection is made.

In step S501, the CPU 115 determines whether the focus detection area of the main face can be in focus based on the in-focus determination result. If the focus detection area of the main face can be in focus (YES in step S501), the focus detection area of the main face is set as the area for the in-focus position determination, and the selection processing of the focus detection area ends.

In step S501, if the focus detection area of the main face cannot be in focus (NO in step S501), the processing proceeds to step S502. In step S502, the CPU 115 initializes the variable "i", which is used for counting the number of secondary faces, to 0, and the processing proceeds to step S503. In step S503, the CPU 115 determines whether the secondary faces can be in focus in order of priority based on the variable "i".

If the CPU 115 determines that a focus detection area of a secondary face can be in focus (YES in step S503), the CPU 115 sets the focus detection area as the area for determining the in-focus position, and the selection processing of the focus detection area ends. In step S503, if the CPU 115 determines that a focus detection area of a secondary face cannot be in focus (NO in step S503), the processing proceeds to step S504. In step S504, the CPU 115 increments "i" by 1, and then the processing proceeds to step S505. In step S505, the CPU 115 determines whether "i" is equal to "the number of detected faces—1". If "i" is not equal to "the number of detected faces—1" (NO in step S505), the processing returns to step S503. If "i" is equal to "the number of detected faces—1" (YES in step S505), the CPU 115 determines that all the focus detection areas are unable to be in-focus, and the selection processing of the focus detection area ends.

According to the above-described exemplary embodiment, although the in-focus state of the object is changed by moving the focus lens 104, the method for changing the in-focus state is not limited to such an example. For example, the image sensor can be moved instead of the focus lens group. Further, as discussed in Japanese Patent Application Laid-Open No. 2011-113174, an image pickup apparatus which can obtain information about an incident angle of a light beam (light field information) can realize the change in the in-focus state through re-configuration processing.

As described above, according to the present embodiment, even if the object moves during the AF scanning operation, high-precision focus detection can be realized by appropriately setting the focus detection area according to the size and the tilt of the face.

A second exemplary embodiment of the present invention will be described with reference to FIG. 7. The main difference between the first exemplary embodiment is the setting method of the focus detection area when there is a plurality of AF evaluation directions. According to the first exemplary embodiment, since only one direction is set as the AF evaluation direction (X direction in FIG. 4), if the contrast is seen only in the vertical direction of the object pattern, changes in the AF evaluation values obtained from the AF scanning are not detected. Thus, the focus detection cannot be performed.

Under such circumstances, Japanese Patent Application Laid-Open No. 2007-57763 discusses a method that enables the AF operation in the contrast detection method by performing contrast evaluations with respect to signals output by scanning, in two directions, a plurality of pixel portions of an image sensor. Thus, the focus detection can be performed even if the contrast of the object pattern is detected only in the vertical direction.

However, Japanese Patent Application Laid-Open No. 2007-57763 does not discuss the setting method of the focus detection area in the two directions in which the contrast detection is performed.

According to the second exemplary embodiment, there are two AF evaluation directions. When a focus detection area is set for a face, an appropriate focus detection area is set for each AF evaluation direction. In this manner, high-precision focus detection can be realized regardless of the movement of the object while the AF scanning is performed.

Since the configurations of the image pickup apparatus including a focus adjustment unit, the AF operation, and the data table used for setting the data focus detection area according to the second exemplary embodiment are similar to those of the first exemplary embodiment described with reference to FIGS. 1 to 3 and FIGS. 5 to 6, descriptions thereof are not repeated.

The method for setting the focus detection area performed in step S103 in FIG. 1 according to the present embodiment will be described with reference to FIG. 7. The processing performed in step S103 according to the second exemplary embodiment is different from the processing in step S103 performed according to the first exemplary embodiment.

Figure 7:
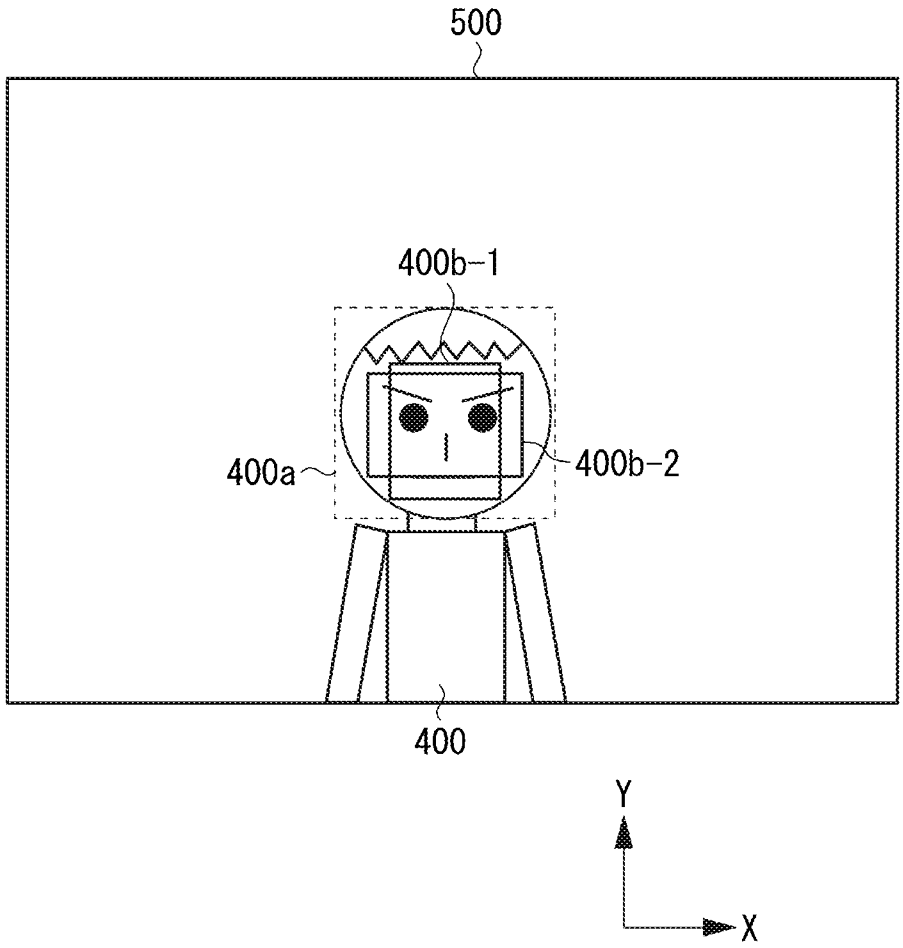
FIG. 7 illustrates the setting of the focus detection area according to a second exemplary embodiment of the present invention.

The imaging screen 500 in FIG. 7 corresponds to the image sensor 108. The AF processing unit 105 obtains the contrast information by calculating a first AF evaluation value and a second AF evaluation value having the X direction in FIG. 7 as a first AF evaluation direction and the Y direction as a second AF evaluation direction. The above-described method discussed in Japanese Patent Application Laid-Open No. 2007-57763 can be used as the method for realizing the AF evaluation in two directions. Further, as another method for realizing the AF evaluation in two directions, the pixel portions of the image sensor are scanned in one direction, and then the output of the face detection area is once stored. Then, the image is rotated in the AF evaluation direction.

As described above, in order to achieve high-precision focus detection, it is necessary to set a focus detection area which includes the high-contrast portion of the face as much as possible and is less likely to be affected by the face outline. Thus, as is the case with the first exemplary embodiment, with respect to the AF evaluation direction, the expansion/contraction ratio of the focus detection area to the face detection area in the direction of the face outline which has more impact on the AF evaluation value is set to a smaller value.

On the other hand, with respect to the AF evaluation direction, the expansion/contraction ratio of the focus detection area to the face detection area in the direction of the face outline which has less impact on the AF evaluation value is set to a greater value. According to the second exemplary embodiment, since there are two AF evaluation directions (X and Y directions), an appropriate shape for each direction can be set for the focus detection area.

Thus, according to the second exemplary embodiment, to detect the in-focus position of the object based on the first AF evaluation value, the AF processing unit 105 uses a first focus detection area whose first expansion/contraction ratio, which is the ratio of the length of the focus detection area to the length of the face detection area in the first AF evaluation direction, is smaller than the second expansion/contraction ratio, which is the ratio of the length of the focus detection area to the length of the face detection area in the second AF evaluation direction. To detect the in-focus position of the object based on the second AF evaluation value, the AF processing unit 105 uses a second focus detection area whose third expansion/contraction ratio, which is the ratio of the length of the focus detection area to the length of the face detection area in the second AF evaluation direction, is smaller than a fourth expansion/contraction ratio, which is the length of the focus detection area to the length of the face detection area in the first AF evaluation direction.

The straight line connecting the two eyes of a person 400 is approximately parallel to the first AF evaluation direction (X direction) and is perpendicular to the second AF evaluation direction (Y direction). The direction of the straight line connecting the two eyes as the first direction corresponds to the X direction. Regarding the person 400, the lateral direction of the face corresponds to the X direction and the longitudinal direction of the face corresponds to the Y direction.

Since the outlines of the left and the right ears in the face outline are perpendicular to the first AF evaluation direction, the impact on the AF evaluation value is great. On the other hand, since the outlines of the jaw and the head are approximately in the direction parallel to the AF evaluation direction, even if the face outline is in the focus detection area, the contrast in the AF evaluation direction is not detected, and the impact on the AF evaluation value is small.

Since the outlines of the jaw and the head included in the face outline are perpendicular to the second AF evaluation direction, the impact on the AF evaluation value is great. On the other hand, the outlines of the right and the left ears are approximately in the direction parallel to the AF evaluation direction. Therefore, even if the face outline is in the focus detection area, the contrast in the AF evaluation direction is not detected, and the impact on the AF evaluation value is small.

Regarding a focus detection area 400*b*-1 in the first AF evaluation direction of the person 400, the expansion/contraction ratio in the lateral direction (X direction) of the face in a face detection area 400*a* is set to a smaller value than the expansion/contraction ratio in the longitudinal direction (Y direction) of the face in the face detection area 400*a*. Further, the center-of-gravity position of the focus detection area 400*b*-1 is set so that the position statistically includes many high-contrast portions in the face area. The expansion/contraction ratio of the focus detection area and the information of the center-of-gravity position are stored in the CPU 115.

Regarding a focus detection area 400*b*-2 in the second AF evaluation direction (Y direction) of the person 400, the expansion/contraction ratio in the lateral direction (X direction) of the face in the face detection area 400*a* is set to a greater value than the expansion/contraction ratio in the longitudinal direction (Y direction) of the face in the face detection area 400*a*. Further, the center-of-gravity position of the focus detection area 400*b*-2 is set so that the position statistically includes many high-contrast portions in the face area. The expansion/contraction ratio of the focus detection area and the information of the center-of-gravity position are stored in the CPU 115.

In this manner, by setting different focus detection areas according to the AF evaluation direction for one face detection area, each focus detection area is less likely to be affected by the face outline and high-precision focus detection can be realized.

Figure 3:
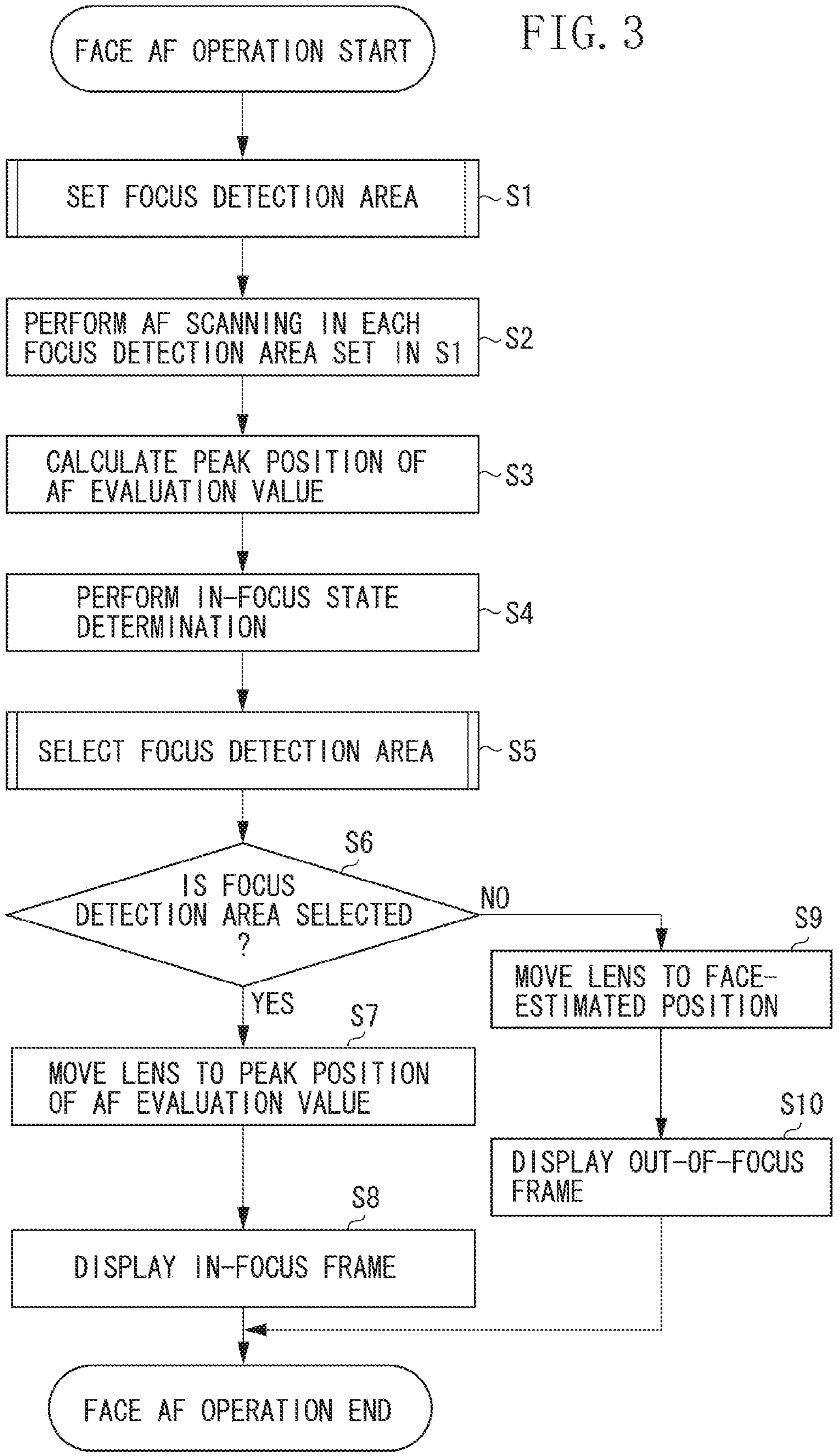
FIG. 3 is a flowchart illustrating an AF operation in a face area according to the first exemplary embodiment.

The AF evaluation values obtained from the focus detection areas 400*b*-1 and 400*b*-2 are, for example, weighted and added in step S1 and subsequent steps in FIG. 3. Accordingly, one AF evaluation value corresponding to the face detection area 400*a* can be calculated.

Further, the use method of the AF evaluation values obtained from the two focus detection areas 400*b*-1 and 400*b*-2 are not limited to the above-described example. For example, the focus detection areas can be treated as independent areas. Regarding the AF evaluation values obtained from each focus detection area, the focus determination in step S4 in FIG. 1 is performed. Then, a focus detection area of high priority such as the main face is selected from the focus detection area which can be in focus and the focus adjustment is performed. If both of the two focus detection areas can be in focus for one face area, both of the focus detection positions can be weighted by using, for example, the AF evaluation value so that one focus detection position is calculated.

The present invention is not limited to the above-described exemplary embodiments, and various changes and modifications can be applied within the scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178059 filed Aug. 10, 2012, which is hereby incorporated by reference herein in its entirety.

What is claimed is:

1. An image pickup apparatus comprising:

an image sensor configured to capture an image of an object formed by an imaging optical system;

a focus detection area setting unit configured to set a focus detection area with respect to a face detection area of the object within an imaging plane of the image sensor; and a focus detection unit configured to obtain a focus evaluation value indicating contrast in a focus evaluation direction of the object in the focus detection area set within the imaging plane of the image sensor based on an image signal obtained by photoelectric conversion by the image sensor, wherein the focus detection area setting unit sets the focus detection area such that a length of the focus detection area in the focus evaluation direction is shorter than a length of the focus detection area in a second direction perpendicular to the focus evaluation direction regardless of a tilt of a face of the object.

2. The image pickup apparatus according to claim 1, further comprising:

an object information acquisition unit configured to, based on the image signal, obtain information with regard to a tilt in a first direction obtained by connecting two eyes of the face with respect to the focus evaluation direction in the imaging plane, wherein the object information acquisition unit obtains information with regard to a position of the face of the object in the imaging plane, and wherein the focus detection area setting unit changes a center-of-gravity position of the focus detection area obtained from the information with regard to the position of the face of the object according to the tilt of the object.

3. The image pickup apparatus according to claim 1, further comprising:

an object information acquisition unit configured to, based on the image signal, obtain information with regard to a tilt in a first direction obtained by connecting two eyes of the face to the focus evaluation direction in the imaging plane, wherein the focus detection area setting unit sets a first expansion/contraction ratio, which indicates a ratio of the length of the focus detection area to a length of the face detection area in the focus evaluation direction, to be smaller than a second expansion/contraction ratio, which indicates a ratio of the length of the focus detection area to the length of the face detection area in a second direction perpendicular to the focus evaluation direction, regardless of the tilt of the face of the object, and wherein the object information acquisition unit obtains information about a size of the face of the object in the imaging plane and, when the size of the face detection area of the object is smaller than a predetermined threshold value, the focus detection area setting unit sets at least one of the first expansion/contraction ratio and the second expansion/contraction ratio to be greater than when the size of the face detection area of the object is larger than the predetermined threshold value.

4. The image pickup apparatus according to claim 1, further comprising:

an object information acquisition unit configured to, based on the image signal, obtain information about a tilt in a first direction obtained by connecting two eyes of the face to the focus evaluation direction in the imaging plane, wherein the focus detection area setting unit sets a first expansion/contraction ratio, which indicates a ratio of the length of the focus detection area to a length of the face detection area in the focus evaluation direction, to be smaller than a second expansion/contraction ratio, which indicates a ratio of the length of the focus detection area to the length of the face detection area in a second direction perpendicular to the focus evaluation direction, regardless of the tilt of the face of the object, and wherein the object information acquisition unit obtains information about a size of the face of the object in the imaging plane and, when the size of the face detection area of the object is smaller than a predetermined threshold value, the focus detection area setting unit sets the proportion of the first expansion/contraction ratio to the second expansion/contraction ratio to be closer to 1 than when the size of the face detection area of the object is larger than the predetermined threshold value.

5. A control method for an image pickup apparatus, the method comprising;

setting a focus detection area with respect to a face detection area of an object in an imaging plane of an image sensor which captures an image of the object formed by an imaging optical system;

obtaining a focus evaluation value indicating contrast in an evaluation direction of the object in the focus detection area set within the imaging plane of the image sensor based on an image signal obtained by photoelectric conversion by the image sensor, and detecting an in-focus position of the object in the focus detection area based on the focus evaluation value, obtaining information about a tilt in a first direction obtained by connecting two eyes of a face to the focus evaluation direction in the imaging plane based on the image signal, and setting a length of the focus detection area in the focus evaluation direction to be shorter than a length of the focus detection area in a second direction perpendicular to the focus evaluation direction, regardless of a tilt of the face of the object.

6. An image pickup apparatus comprising:

an image sensor configured to capture an image of an object formed by an imaging optical system;

a focus detection area setting unit configured to set a focus detection area with respect to a face detection area of the object within an imaging plane of the image sensor;

a focus detection unit configured to obtain a focus evaluation value indicating contrast in a focus evaluation direction of the object in the focus detection area set within the imaging plane of the image sensor based on an image signal obtained by photoelectric conversion by the image sensor; and an object information acquisition unit configured to, based on the image signal, obtain information with regard to a tilt in a first direction obtained by connecting two eyes of the face with respect to the focus evaluation direction in the imaging plane, wherein the focus detection area setting unit sets a first expansion/contraction ratio, which indicates a ratio of a length of the focus detection area to a length of the face detection area in the focus evaluation direction, to be smaller than a second expansion/contraction ratio, which indicates a ratio of the length of the focus detection area to the length of the face detection area in a second direction perpendicular to the focus evaluation direction, regardless of the tilt of the face of the object.

7. A method for controlling an image pickup apparatus, the method comprising:

setting a focus detection area with respect to a face detection area of an object within an imaging plane of the image sensor for capturing an image of the object formed by an imaging optical system;

obtaining a focus evaluation value indicating contrast in a focus evaluation direction of the object in the focus detection area set within the imaging plane of the image sensor based on an image signal obtained by photoelectric conversion by the image sensor, and detecting an in-focus position of the object in the focus detection area based on the focus evaluation value;

obtaining, based on the image signal, information with regard to a tilt in a first direction obtained by connecting two eyes of the face with respect to the focus evaluation direction in the imaging plane; and setting a first expansion/contraction ratio, which indicates a ratio of a length of the focus detection area to a length of the face detection area in the focus evaluation direction, to be smaller than a second expansion/contraction ratio, which indicates a ratio of the length of the focus detection area to the length of the face detection area in a second direction perpendicular to the focus evaluation direction, regardless of the tilt of the face of the object.

* * * * *